United States Patent
Bly et al.

(10) Patent No.: US 8,948,175 B2
(45) Date of Patent: Feb. 3, 2015

(54) SELECTING A LINK OF A LINK GROUP BASED ON CONTENTS OF A CONCEALED HEADER

(75) Inventors: Keith Michael Bly, Newman Lake, WA (US); Dackary Ronald Busch, Veradale, WA (US)

(73) Assignee: Ciena Corporation, Hanover, MD (US)

(*) Notice: Subject to any disclaimer, the term of this patent is extended or adjusted under 35 U.S.C. 154(b) by 193 days.

(21) Appl. No.: 13/300,315

(22) Filed: Nov. 18, 2011

(65) Prior Publication Data
US 2013/0128890 A1     May 23, 2013

(51) Int. Cl.
*H04L 12/28* (2006.01)
*H04L 12/46* (2006.01)
*H04L 12/721* (2013.01)

(52) U.S. Cl.
CPC ........ *H04L 12/4633* (2013.01); *H04L 12/4658* (2013.01); *H04L 45/66* (2013.01)
USPC ........................................................ 370/392

(58) Field of Classification Search
USPC ........................................................ 370/392
See application file for complete search history.

(56) References Cited

U.S. PATENT DOCUMENTS

| | | | |
|---|---|---|---|
| 6,901,048 B1* | 5/2005 | Wang et al. | 370/228 |
| 2005/0243834 A1* | 11/2005 | Fukuda | 370/395.1 |
| 2008/0031263 A1* | 2/2008 | Ervin et al. | 370/397 |
| 2009/0279550 A1* | 11/2009 | Romrell et al. | 370/395.4 |
| 2010/0214913 A1* | 8/2010 | Kompella | 370/230 |
| 2010/0215042 A1* | 8/2010 | Sato et al. | 370/392 |

OTHER PUBLICATIONS

K. Kompella et al., Draft Update to IETF 3031 MPLS Standard entitled "The Use of Entropy Labels in MPLS Forwarding," Oct. 31, 2011.

* cited by examiner

*Primary Examiner* — Minh-Trang Nguyen
(74) *Attorney, Agent, or Firm* — Muncy, Geissler, Olds & Lowe, P.C.

(57) ABSTRACT

Methods, devices, and systems for selecting a link of a link group based on contents of a concealed header are disclosed. A network node operating method includes a first network node receiving a packet and concluding that a link group connecting the first network node to a second network node will forward the packet to the second network node. The method further includes determining that the packet includes a tunnel header and an original header concealed by the tunnel header, selecting one link from among a set of parallel links of the link group based at least on one or more fields of the concealed original header, and forwarding the packet to the second network node via the selected link.

20 Claims, 9 Drawing Sheets

US 8,948,175 B2

SELECTING A LINK OF A LINK GROUP BASED ON CONTENTS OF A CONCEALED HEADER

TECHNICAL FIELD

The present invention, in various embodiments, relates to selecting a link of a link group based on contents of a concealed header.

BACKGROUND OF THE INVENTION

Link groups made up of a group of physical links connecting network nodes are commonly used in data packet networks. When a network node forwards a packet to a link group, the network node must determine which physical link of the link group will carry the packet. Known solutions for distribution of traffic over the link group include the use of fields of a delivery header of the packet in a polynomial equation that produces a distribution of traffic.

The distribution function works fine, so long as the delivery headers of packets have some variety in their fields. However, if there is little variety in the fields of the delivery headers, as is often the case with tunneled packets, known solutions tend to favor a subset of the physical links of the link group and therefore do not provide a good distribution of traffic across the link group. This resulting poor distribution is inefficient and may lead to discarded packets despite the link group having adequate aggregate bandwidth to carry the discarded packets.

SUMMARY

In one embodiment, a network node operating method includes a first network node receiving a packet, concluding that a link group connecting the first network node to a second network node will forward the packet to the second network node, and determining that the packet comprises a tunnel header and an original header concealed by the tunnel header. The method further includes selecting one link from among a set of parallel links of the link group based at least on one or more fields of the concealed original header, and forwarding the packet to the second network node via the selected link.

In one embodiment, a network node operating method includes assigning a first packet to a first link of a set of parallel links of a link group connecting two network nodes based on a delivery header of the first packet, the first packet not comprising a concealed original header. The method further includes assigning a second packet comprising a delivery header and a concealed original header to a second link of the link group based at least on one or more fields of the concealed original header.

In one embodiment, a network node includes a plurality of ports, a switching fabric configured to forward packets to the plurality of ports, and distribution circuitry. The distribution circuitry is configured to receive a packet from one of the ports and determine that the received data packet comprises a tunnel header and an original header concealed by the tunnel header. The distribution circuitry is further configured to select one link from among a set of parallel links of a link group associated with two or more of the ports of the plurality based at least on one or more fields of the concealed original header and instruct the switching fabric to forward the packet to the port of the plurality associated with the selected link.

BRIEF DESCRIPTION OF THE DRAWINGS

Preferred embodiments of the invention are described below with reference to the following accompanying drawings.

DETAILED DESCRIPTION OF THE PREFERRED EMBODIMENTS

Figure 1:
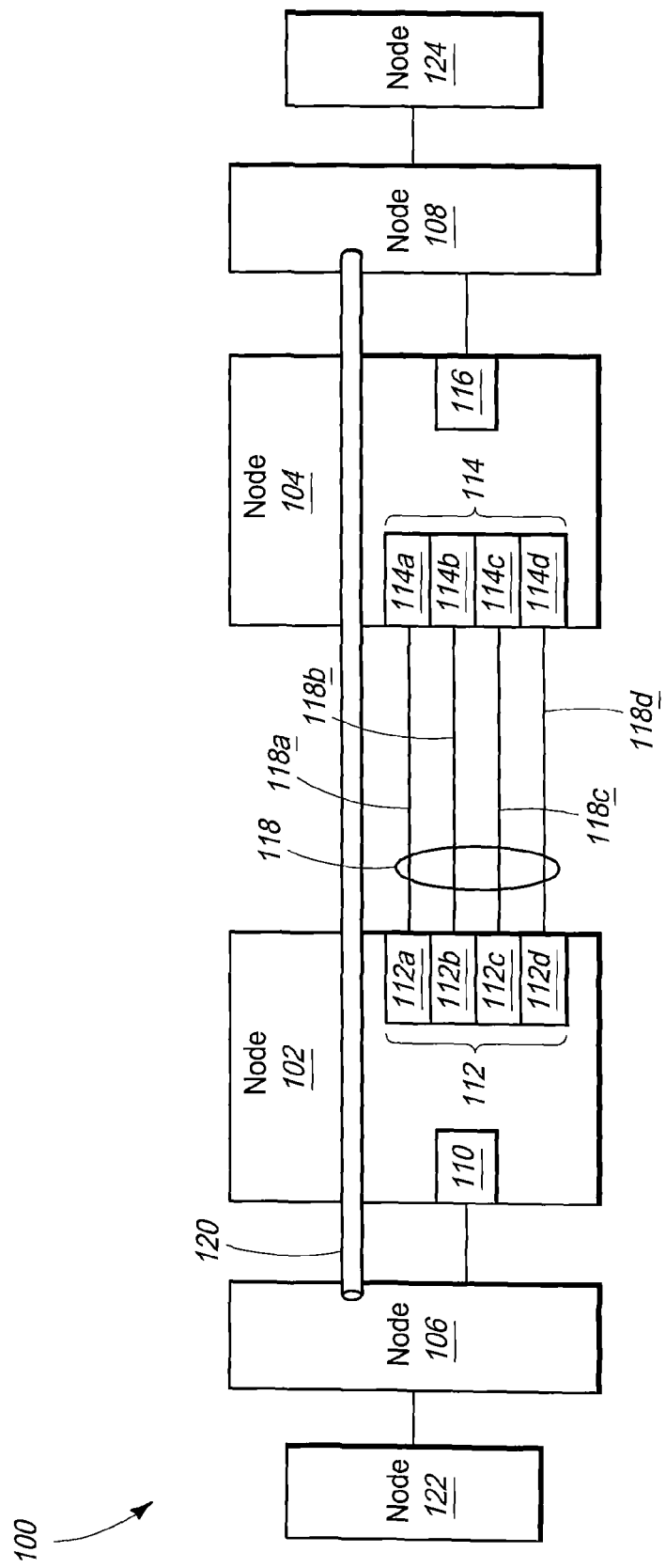
FIG. 1 is a block diagram of a communications network according to one embodiment.

Referring to FIG. 1, a block diagram of a communications network 100 according to one embodiment is illustrated. Communications network 100 includes communication nodes 102, 104, 106, 108, 122, and 124. The communication nodes may be devices configured to receive data packets (e.g., Ethernet packets) on one port of the node and forward the received data packets to another port of the node, which may transmit the data packets to another node. Example nodes include data packet switches and data packet routers.

Nodes 102 and 104 are connected by link group 118. Link group 118 includes four physical links 118a, 118b, 118c, and 118d. Each physical link of link group 118 is capable of forwarding data packets and is connected to a different port of node 102 and a different port of node 104 relative to one another. For example, as illustrated in FIG. 1, link 118a is connected to port 112a of node 102 and port 114a of node 104. In one embodiment, link group 118 is an Ethernet link aggregation group and links 118a, 118b, 118c, and 118d are each physical Ethernet links (e.g., wired, optical, wireless) belonging to the Ethernet link aggregation group. Link group 118 may alternatively be referred to as an aggregation, a set of trunked links, a set of bundled links, a set of bonded links, or a set of teamed links.

Link group 118 may be referred to as a set of parallel physical links since the physical links (118a, 118b, 118c, and 118d) of link group 118 have the same endpoints, namely nodes 102 and 104. Link group 118 may provide several advantages compared to a configuration in which a single link connects nodes 102 and 104. For example, the aggregate bandwidth provided by link group 118 may be greater than the bandwidth provided by a single link.

Furthermore, link group 118 may provide redundancy. For example, if one of the links of link group 118 fails, the remaining links of link group 118 may continue to function, thereby continuing to provide connectivity between nodes 102 and 104 despite the failed link. The aggregate bandwidth provided by link group 118 may be decreased, however, due to the failed link. In contrast, if a single link connects nodes 102 and 104 and the single link fails, nodes 102 and 104 will no longer be connected. One of skill in the art will recognize other advantages associated with link group 118.

In some embodiments, a protocol (e.g., link aggregation control protocols defined at least in part by the Institute of Electrical and Electronics Engineers (IEEE) 802.3ad and 802.1ax standards) may be used by nodes 102 and 104 to monitor, configure, and/or control link group 118. The protocol may be used to track the status of the links of link group 118 or provide other information about the links. Furthermore, in some configurations the links of link group 118 may share a common link group address, such as a common layer-two Ethernet MAC address.

The physical links of link group 118 may form a single logical channel associated with a logical port 112 of node 102 and a logical port 114 of node 104. In deciding where to forward received packets, node 102 may decide to forward packets to logical port 112 and may later determine which physical port (112a, 112b, 112c, or 112d) associated with logical port 112 should forward the packet based on a distribution algorithm such as the distribution algorithms described below.

As illustrated in FIG. 1, node 102 is connected to node 106 via port 110 and node 106 is connected to node 122. Similarly, node 104 is connected to node 108 via port 116 and node 108 is connected to node 124.

In one embodiment, a generic routing encapsulation (GRE) tunnel 120 extends from node 106 to node 108. GRE tunnel 120 is facilitated by nodes 102 and 104 and link group 118. Node 106 may modify packets it receives from node 122 to comply with a format of GRE tunnel 120 prior to forwarding the received packets to node 108 via GRE tunnel 120 (and therefore via nodes 102 and 104 and link group 118). Furthermore, upon receiving packets from GRE tunnel 120, node 108 may modify the received packets to remove the GRE tunnel formatting added by node 106 prior to forwarding the packets to node 124.

Nodes 106 and 108 may operate in a complementary manner when forwarding packets in an opposite direction from node 108 to node 106 such that node 108 adds GRE tunnel formatting to packets received from node 124 prior to forwarding the packets via GRE tunnel 120 to node 106. Node 106 then removes the GRE tunnel formatting added by node 108 from the packets upon receiving the packets from GRE tunnel 120 prior to forwarding the packets to node 122.

In one embodiment, the format of GRE tunnel 120 may comply with RFC 2784 published by the Internet Engineering Task Force (IETF) in March 2000, which is incorporated herein by reference. Furthermore, the format may additionally or alternatively comply with RFC 2890 published by the IETF in September 2000, which is also incorporated herein by reference.

Figure 2:
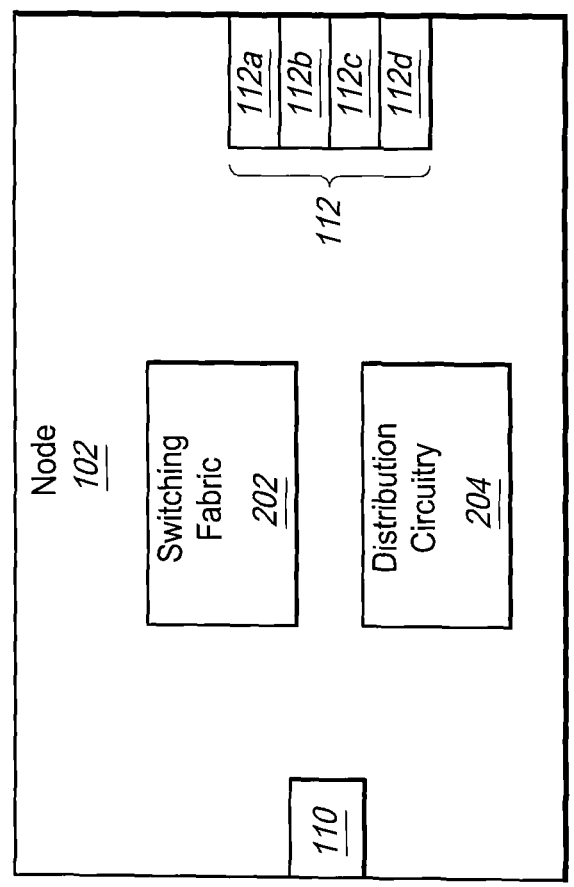
FIG. 2 is a block diagram of a node according to one embodiment.

Referring to FIG. 2, block diagram of node 102 is illustrated. As was discussed above, node 102 includes physical ports 110, 112a, 112b, 112c, and 112d, as well as logical port 112. Node 102 may also include additional ports not illustrated in FIG. 2. Node 102 also includes switching fabric 202, which is configured to forward packets between the ports of node 102. For example, switching fabric 202 may receive a packet from port 110 and forward the packet to port 112a. Switching fabric 202 may be implemented in hardware such as an FPGA, ASIC, gate array, or other circuitry configured to forward packets from one port of a node to another port of the node.

Node 102 also includes distribution circuitry 204. Once node 102 has determined that a packet will be transmitted out of node 102 via logical port 112, distribution circuitry 204 selects one physical port associated with logical port 112 on which to transmit the packet using a distribution algorithm such as a hashing algorithm. By selecting the physical port, distribution circuitry 204 also selects a link (e.g., physical link 112a) from among the set of parallel links of link group 118 on which the packet is transmitted.

For some link groups, if a packet is assigned to a selected link of the link group, but the selected link does not have capacity to forward the packet because its capacity is being consumed in forwarding other packets, node 102 may discard the packet. Accordingly, one goal of the distribution algorithm of distribution circuitry 204 is to distribute packets across the links of the link group in a way that takes advantage of the bandwidth of the link group and in a way that prevents discarded packets or minimizes the number of packets discarded by node 102.

Conventional distribution algorithms may use information taken from a layer-two header of a packet that is nearest the front of the packet in a hashing algorithm to assign the packet to a link of the link group. In some cases, this layer two header is the only layer-two header of the packet. In other cases, the packet may include other concealed headers as discussed in detail below. Other distribution algorithms may additionally or alternatively use information taken from a layer-three header of the packet that is nearest the front of the packet and/or a layer-four header of the packet that is nearest the front of the packet.

The premise for using such information in the hashing algorithm is that the information will vary from packet to packet and therefore packets will be hashed to different links of the link group because they contain different information in their headers. A problem arises, however, when information in the headers does not vary across packets carried by a link group. For example, in system 100 of FIG. 1, node 106 may modify packets forwarded via GRE tunnel 120 by adding one or more similar or identical tunnel headers (described in more detail below) to each of the packets such that all or portions of the headers of each of the packets transported by GRE tunnel 120 are identical.

If a conventional distribution algorithm is used for assigning such packets to links of link group 118, the packets may all be assigned to the same link of link group 118 since the information taken from headers of the packets and used in the conventional distribution algorithm is the same for each packet. This is because each packet has the same or similar tunnel headers. Assigning the packets to the same link is problematic since the one link to which all of the packets are assigned may be overused and may even discard packets if node 102 is attempting to forward more packets on the link than the link is physically able to accommodate. At the same time, other links of link group 118 may be underutilized since few or no packets will be assigned to those links by the conventional distribution algorithm.

Alternative distribution algorithms that prevent these problems are described below. Such alternative distribution algorithms may be executed by distribution circuitry 204, which may be implemented as hardware (e.g., an FPGA, ASIC, gate array, etc.) or as a combination of hardware and software (e.g., software instructions executed by a physical processor). Example packet formats will now be described to provide a foundation from which a description of the alternative distribution algorithms will be based. The packet formats will be described with respect to various layers of the Open Systems Interconnect (OSI) model developed by the International Standards Organization.

Figure 3:
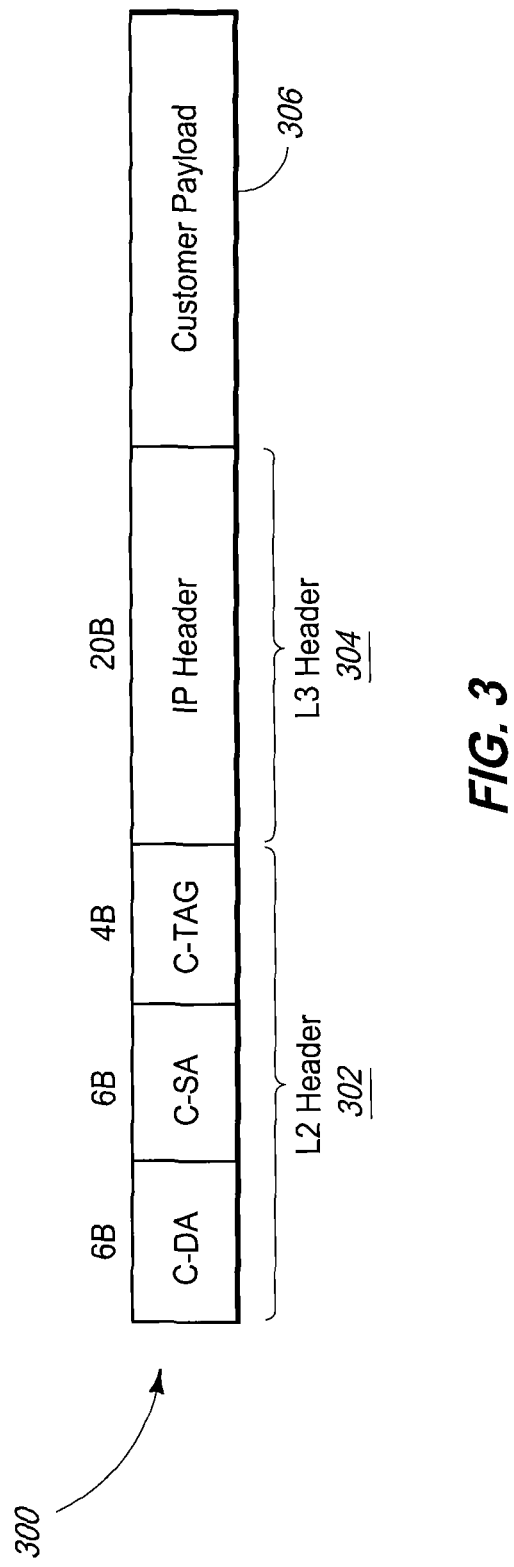
FIG. 3 illustrates a packet format according to one embodiment.

Referring to FIG. 3, an example packet 300 is illustrated. Example packet 300 is an Ethernet and Internet Protocol (IP) packet. Packet 300 includes a layer two header 302, a layer-three header 304, and customer payload 306. The term header as used herein refers to overhead information that is part of a data packet. The overhead information is used to facilitate the transfer of data from one device (or application running on the device) to another device (or application running on the other device). In the example illustrated in FIG. 3, layer-two header 302 is an Ethernet header used in communicating on one or more Ethernet networks. Layer-two header 302 includes a six-byte customer destination address (CDA), also referred to as a MAC address, a six-byte customer source address (CSA), also referred to as a MAC address, and a four-byte customer tag (C-TAG). These fields are referred to as customer fields because they are associated with and created by a customer device that originally created packet 300.

Layer-three header 304 is a twenty-byte header that includes a source IP address and a destination IP address used in forwarding packet 300 to a desired destination. Layer-three header 304 may be referred to as a customer header since it was also created by the customer device that originally created packet 300. Customer payload 306 includes not only data being relayed to a destination device, but may also include headers from other layers of the OSI model such as a layer four transmission control protocol (TCP) header.

With respect to packet 300, layer-two header 302 and layer-three header 304 may both be referred to as original headers since they are the original headers created by the customer device. Furthermore, layer-two header 302 and layer-three header 304 may both be referred to as delivery headers. A delivery header as used herein is a header placed within a predetermined location of a packet. Nodes processing the packet are aware of the predetermined location and thus can easily find and operate on the delivery header. For example, layer-two header 302 is a layer-two delivery header for packet 300 because it is located at the front of packet 300 in a location where an Ethernet switch would look for the layer-two header. Similarly, layer-three header 304 is a layer-three delivery header for packet 300 due to its location after layer-two header 302 in packet 300.

In one example, node 122 of FIG. 1 may create packet 300 and forward packet 300 to node 106. Node 106 may determine that packet 300 should be forwarded to node 108 via GRE tunnel 120. In response to this determination, node 106 may modify packet 300 to have a format suitable for GRE tunnel 120.

Figure 4:
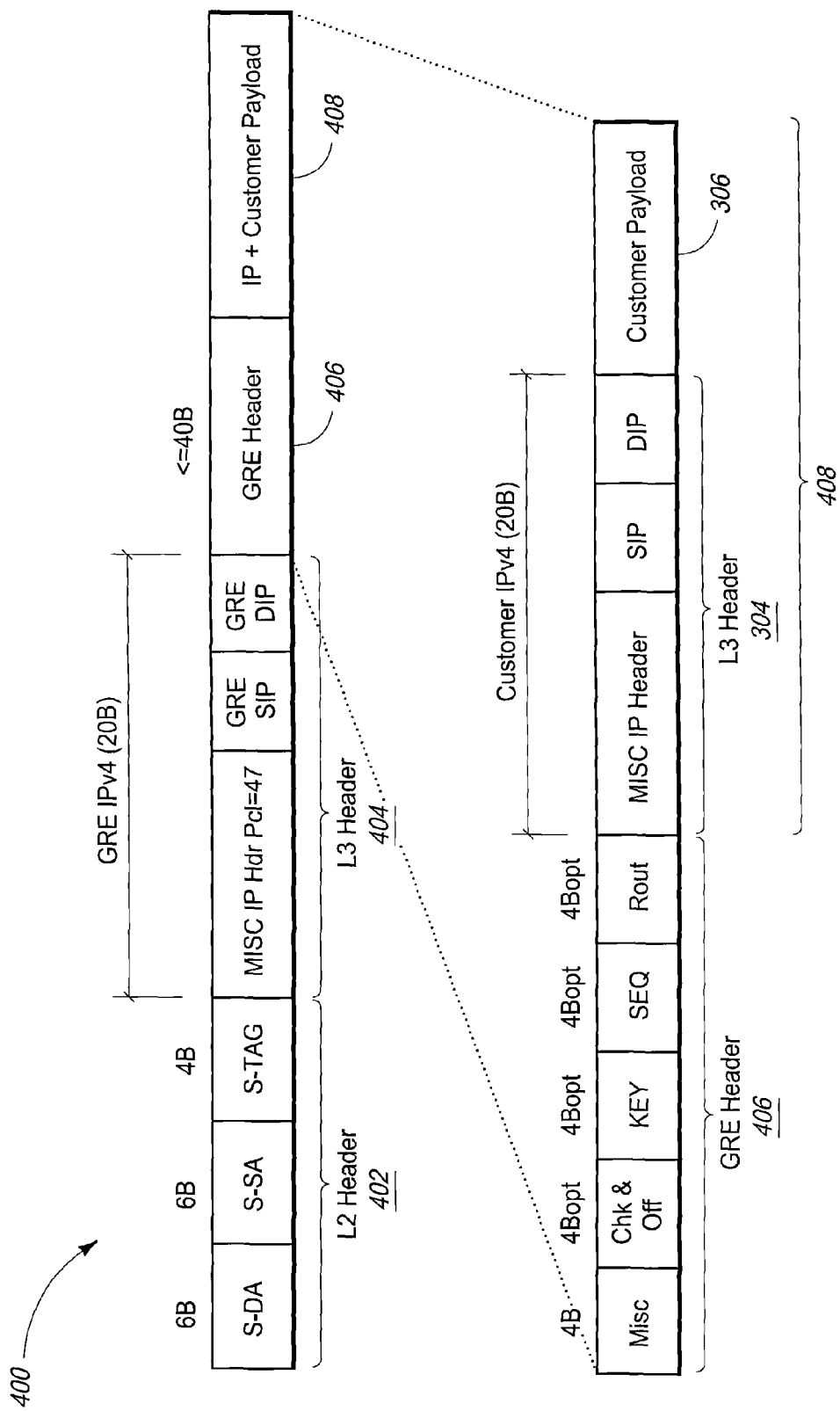
FIG. 4 illustrates another packet format according to one embodiment.

Referring to FIG. 4, an example packet 400 is illustrated. Packet 400 is a version of packet 300 that has been formatted (e.g., by node 106) for GRE tunnel 120. Note that packet 400 retains customer payload 306 and layer-three header 304 which are together referred to as IP+ customer payload 408. In addition, packet 400 includes GRE header 406, layer-three header 404, and layer-two header 402.

Layer-two header 302, in one embodiment, may be removed and replaced in its entirety with layer-two header 402, layer-three header 404, and GRE header 406. Layer-two header 402 includes an Ethernet service provider destination address (S-DA), an Ethernet service provider source address (S-SA), an Ethernet service provider tag (STAG). Note that since layer-two header 402 is at the beginning of packet 400 it is a layer-two delivery header for packet 400. The contents of GRE header 406 allow a node at a far end of a GRE tunnel to resolve/regenerate the appropriate customer layer-two header (e.g., layer-two header 302) when a packet exits the GRE tunnel.

Layer-three header 404 contains address and other information related to GRE tunnel 120 including a GRE source IP address (SIP) and a GRE destination IP address (DIP). These addresses indicate the endpoints of GRE tunnel 120. Accordingly, layer-three header 404 may be referred to as a tunnel header.

In one embodiment, the source IP address of layer-three header 404 may be different than the source IP address of layer-three header 304. In particular, the source IP address of layer-three header 404 may be the IP address of node 106, which added layer-three header 404 to the packet, and the source IP address of layer-three header 304 may be the IP address of the customer device that created the original version of the packet. Similarly, the destination IP address of layer three header 404 may be different from the destination IP address of layer-three header 304. In particular, the destination IP address of layer-three header 404 may be the IP address of node 108 and the destination IP address of layer-three header 304 may be the IP address of the device to which the customer device wants to send the packet.

Note that packet 400 includes both layer-three header 304 and layer three header 404. Of these, layer-three header 404 is a delivery header due to its position following layer-two header 402 in packet 400 and is a tunnel header as noted above. Layer-three header 304 is not a delivery header in this case because it is located later in packet 400 in a location where simple network nodes that are configured to look for a layer-three header near the front of a packet immediately following a layer-two header will not recognize layer-three header 304 as being a header.

Layer-three header 404 (the tunnel header) has displaced layer-three header 304 (the original header) from being the delivery header by pushing layer three header 304 deeper into the packet. As a result, layer-three header 304 is offset from the front of packet 400 by a different number of bits than if layer-three header 404 was not present in packet 400. In other words, if layer-three header 404 and GRE header 406 were not added to packet 400, layer-three header 304 would be the delivery header, not layer-three header 404. Layer-three header 304 may be referred to as being concealed by layer-three header 404 since layer-three header 404 is now the delivery header. As was mentioned above, layer-three header 304 is considered an original header and thus, in packet 400, layer-three header 304 may be described as a concealed original header. Another way of describing layer-three header 304 is to say that layer-three header 304 is encapsulated by layer-three header 404.

Packet 400 also includes GRE header 406, which includes the fields illustrated in FIG. 4. These fields further describe parameters of GRE tunnel 120. Layer-three header 304 and customer payload 306 may be identical to layer-three header 304 and customer payload 306 of packet 300 in one embodiment. In other embodiments, layer-three header 304 and customer payload 306 may be slightly different due to small changes such as an incremented hop count or decremented time to live value. However, the customer data of customer payload 306 remains unchanged.

Figure 5:
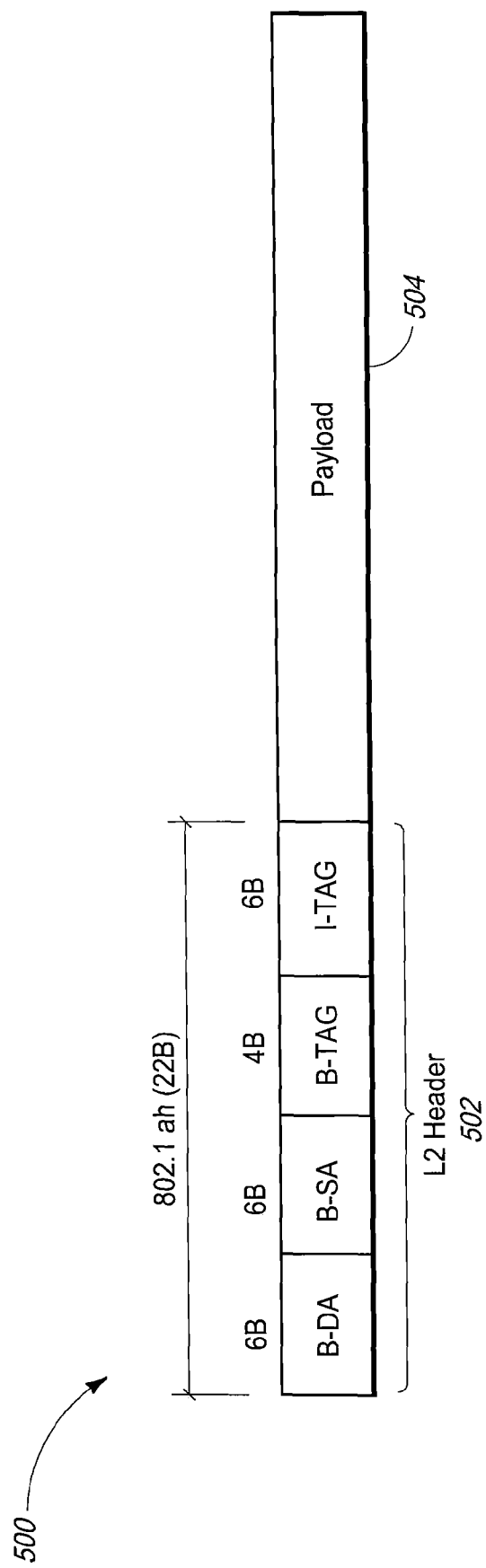
FIG. 5 illustrates yet another packet format according to one embodiment.

Referring to FIG. 5, an example packet 500 is illustrated. Packet 500 includes layer-two header 502 and payload 504. Layer-two header 502 is a provider backbone bridge (PBB) header as used in the IEEE 802.1 ah standard and the IEEE 802.1 Qay PBB-TE standard. Layer-two header 502 includes a backbone Ethernet destination address (B-DA), a backbone Ethernet source address (B-SA), a backbone VLAN tag (B-TAG), and an instance tag (I-TAG). Layer-two header 502 may be used by with tunnels such as PBB tunnels. Accordingly, layer-two header 502 may be referred to as a tunnel header.

In one embodiment, payload 504 may be packet 300 of FIG. 3. In this embodiment, packet 500 includes layer-two header 502, which is both a delivery header with respect to layer two and a tunnel header. In this embodiment, packet 500 also includes layer-two header 302, which is a concealed original header since it is concealed by layer-two header 502. In this embodiment, packet 500 also includes layer-three header 304, which is an original header and is also a delivery header with respect to layer three.

In one embodiment, the source address of layer-two header 502 may be different than the source address of layer-two header 302. In particular, the source address of layer-two header 502 may be the MAC address of node 106, which added layer-two header 502 to the packet, and the source address of layer-two header 302 may be the MAC address of the customer device that created the original version of the packet. Similarly, the destination address of layer-two header 502 may be different from the destination address of layer-two header 302. In particular, the destination address of layer-two header 502 may be the MAC address of node 108 and the destination address of layer-two header 302 may be the MAC address of node 106.

In another embodiment, payload 504 may be packet 400 of FIG. 4. In this embodiment, packet 500 includes layer-two header 502, which is both a delivery header with respect to layer two and a tunnel header. In this embodiment, packet 500 also includes layer-two header 402, which is a concealed header concealed by layer-two header 502. Furthermore, in this embodiment, packet 500 includes layer three header 404, which is a tunnel header and a delivery header with respect to layer three and layer-three header 304, which is a concealed original header.

Returning now to FIG. 1, in one embodiment, node 106 receives a packet in the format illustrated by packet 300 from node 122 and converts the packet into the format illustrated by packet 400. Node 106 then forwards the converted packet to node 102. Node 102 receives the packet and concludes, for example based on layer-two header 402, that logical port 112 and therefore link group 118 will forward the packet. In some cases, node 102 may make this conclusion without considering any of the fields of concealed layer-three header 304. In another example, the packet may be in the format illustrated by packet 500 with payload 504 of packet 500 being packet 400. In this case, node 102 may make the conclusion based on layer-two header 502.

Next, distribution circuitry 204 determines that the packet includes a tunnel header, for example layer-three header 404, and an original header concealed by the tunnel header, for example layer-three header 304. In one embodiment, distribution circuitry 204 makes this determination based on one or more fields of the tunnel header. For example, in one embodiment, distribution circuitry 204 makes the determination based on a finding that a protocol field of layer-three header 404 has a value of 47 indicating that the packet is a GRE packet with a concealed original IP header. The fact that layer-three header 404 has a protocol value of 47 may also indicate that the packet includes GRE header 406. Knowing this helps node 102 find the location of concealed layer-three header 304 within the packet by indicating to node 102 that GRE header 406 is in between layer-three header 404 and layer-three header 304.

Distribution circuitry 204 then selects one physical link of link group 118 on which to forward the packet based on one or more fields of the packet. In particular, distribution circuitry 204 may select the link based on one or more fields of the concealed original header, for example the SIP and/or the DIP of layer-three header 304. Distribution circuitry 204 may additionally consider on one or more fields of the tunnel header, layer-three header 404 when making the selection. In some embodiments, distribution circuitry 204 may additionally or alternatively select the physical link based on one or more fields of GRE header 406, such as the key field of GRE header 406.

Furthermore, distribution circuitry 204 may base the selection of the physical link on other fields of the packet, for example, the S-TAG of layer-two header 402, and a layer-four port number of customer payload 306. In the example in which the packet may be in the format illustrated by packet 500 with payload 504 of packet 500 being packet 400, distribution circuitry 204 may base the selection of the physical link, at least in part, on one or more fields of layer-two header 502.

In some embodiments, distribution circuitry 204 may be configured select the physical link and assign the packet to the selected link prior to forwarding the packet to switching fabric 202. Although the example packets illustrated in FIGS. 3-5 are related to GRE tunnels, distribution circuitry 204 may select a physical link for a packet from among the links of link group 118 based on fields of concealed original headers of other packet formats. For example, other packet formats having tunnel headers and concealed original headers include QnQ packets, PBB packets, PBB-TE packets, GPRS Tunneling Protocol (GTP) packets, and MPLS packets. In addition, distribution circuitry 204 is able to forward packets having different formats on the link group simultaneously.

In summary, distribution circuitry 204 may base the selection of the physical link on fields of concealed original headers and may additionally base the selection on other fields of the packet, such as tunnel headers.

Node 102 then forwards the packet to node 104 on the selected link. Node 102 might not alter any of the addresses (e.g., layer-two source and destination addresses, layer-three source and destination addresses) of the packet (whether in tunnel headers or original headers) when forwarding the packet to node 104. In other words, the addresses in the version of the packet forwarded to node 104 may be the same as the addresses in the version of the packet received by node 102.

Node 102 may subsequently receive a second packet from node 106 and forward the second packet to node 104 using link group 118. Node 106 may format the second packet so that it may be transported by a GRE tunnel 120. Accordingly, the first packet and the second packet may have the same source IP address in layer-three header 404 since both the first packet and the second packet are being forwarded by GRE tunnel 120. Furthermore, the first packet and the second packet may both have the same destination IP address in layer-three header 404.

Distribution circuitry 204 may determine that the second packet has an original header (layer-three header 304) concealed by layer-three header 404 using the methods described above in relation to the first packet. Distribution circuitry 204 may then select a link belonging to link group 118 for forwarding the second packet based at least on one or more fields of the concealed original header of the second packet. The link selected to forward the second packet may be different than the link selected for forwarding the first packet because the fields of the concealed original header of the second packet on which distribution circuitry 204 makes its selection may be different from the fields of the concealed original header of the first packet. Node 102 may then forward the second packet to node 104 via the selected link.

The behavior of node 102 with respect to the second packet illustrates a key advantage over conventional distribution algorithms. Using conventional distribution algorithms, the first and second packets would be sent on the same link of link group 118 since both the first and second packets have the same or very similar tunnel headers. Distribution circuitry 204 however selects different links of link group 118 for the first packet and the second packet since the fields of the concealed original headers of the first and second packets are different from one another. This behavior increases the efficiency of system 100 by distributing packets among the links of link group 118 rather than concentrating packets on a single link of link group 118.

In one embodiment, distribution circuitry 204 may be configured to accommodate both original packets that are free from tunnel headers and tunneled packets including both tunnel headers and concealed original headers. For example, distribution circuitry 204 may assign a first packet to a first link of link group 118 based on a delivery header of the first packet. The first packet may be an original packet that does not include any tunnel headers. Accordingly, the delivery header of the first packet may be an original header, not a tunnel header. Distribution circuitry 204 may then assign a second packet to a second link of link group 118 based on one or more fields of a concealed original header in the second packet. The second packet may be a tunnel packet including both a tunnel header (which is also a delivery header) and a concealed original header.

In one embodiment, the delivery header of the first packet and the delivery header of the second packet may both include the same source IP address and/or same destination IP address. However, distribution circuitry 204 may assign the first and second packets to different links of link group 118 despite the fact that they both include the same source IP address and/or destination IP address in their delivery headers because distribution circuitry 204 may consider fields of the concealed original header of the second packet, which may influence distribution circuitry 204 assign the second packet to a different link of link group 118 than the first packet.

In some embodiments, distribution circuitry 204 may automatically accommodate both the first packet and the second packet without requiring any user intervention between the processing of the first packet and the processing of the second packet. In other words, distribution circuitry 204 may intelligently recognize the difference between original packets and tunneled packets and apply a different distribution algorithm to original packets than to tunneled packets.

Figure 6:
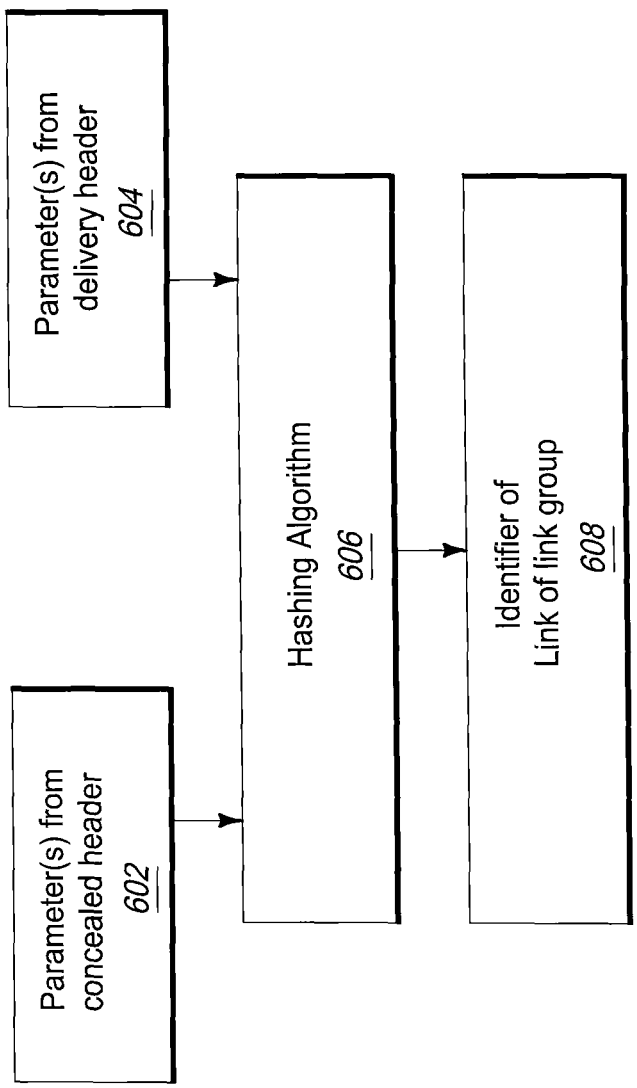
FIG. 6 is a flow chart illustrating determination of an identifier of a link of a link group according to one embodiment.

Referring now to FIG. 6, a flowchart illustrating a method is illustrated. According to the method, distribution circuitry 204 selects a link from among link group 118 using a hashing algorithm 606. Inputs to hashing algorithm 606 include parameters (fields) from concealed headers 602 and may optionally include parameters from delivery headers 604. Hashing algorithm 606 may use both parameters 602 and parameters 604 determining an identifier 608 of a selected link of link group 118. This method differs from conventional methods in that distribution circuitry 204 is able to use fields from concealed headers in hashing algorithm 606 since distribution circuitry 204 is able to determine whether a packet includes concealed original headers using the methods described above.

Using fields from concealed original headers helps distribute packets among the links of link group 118 rather than concentrating the packets on one or a handful of the links of link group 118. This is especially helpful when thousands of customer traffic flows, each having different concealed original headers, are forwarded using one or a few tunnels such as GRE tunnels since fields of the delivery headers of each of the packets associated with a GRE tunnel may be the same. Furthermore, using fields from concealed original headers in selecting a link of a link group helps to improve network connectivity utilization and load balancing of tunneled traffic.

In one embodiment, distribution circuitry 204 may receive packets all having the same tunnel header (or very similar tunnel headers) because the packets are all associated with the same GRE tunnel or other tunnel or other form of aggregation. If distribution circuitry 204 was to distribute the packets among links of a link group based on the tunnel header, the packets might all be assigned to the same link of the link group since each packet has the same (or a very similar) tunnel header. This is because the input to the hashing algorithm (portions of the tunnel header) is the same for each packet and therefore the output (link assignment) of the hashing algorithm may also be the same for each packet.

However, each of these packets may be associated with a different customer flow and may therefore have a different concealed original header. Distribution circuitry 204 distributes the packets among the links of the link group based, at least in part, on the different concealed original headers. In this case, the input to the hashing algorithm is a portion of the concealed original header (which varies among the packets) and therefore the output of the hashing algorithm (the link assignment) will also vary among the packets. As a result, distribution circuitry 204 distributes the packets among the links of the link group in a much more even fashion than if the tunnel header was used for the distribution. Doing so advantageously provides increased efficiency and utilization of the link group.

Distribution circuitry 204 is configured to recognize whether a packet has a concealed original header and is further configured to determine where in the packet the concealed original header is located. Distribution circuitry 204 is further configured to quickly read all or portions of the concealed original header and assign the packet to a link of the link group based, at least in part, on the concealed original header. Accordingly, distribution circuitry 204 may include circuitry configured to inspect, locate, and read from concealed original headers, which are located deeper in the packet than the delivery header of the packet. This additional circuitry and/or capability is not present in known network nodes, which do not have the ability look beyond the delivery header of a packet when forwarding the packet or assigning the packet to a link of a link group.

Hashing algorithm 606 may use a hashing polynomial to determine which link of a group of links is used to forward a packet. In one embodiment, the hashing polynomial is comprised of four one-byte fields. One method of populating the four fields is described below.

Part A

If a packet is a Provider Backbone Transit (PBT-transit) packet, such as the packet illustrated in FIG. 5, use the source and destination addresses from layer two header 502 (B-DA and B-SA). If the packet is a standard Ethernet packet, such as the packet illustrated in FIG. 3, use the C-SA and C-DA from layer-two header 302.

A is the first 4 bits (nibble) of the least significant byte (LSB) of the source address, e.g., SA[5], left-shifted 4 bits, then concatenated with the first nibble of the LSB of the destination address, e.g., DA[5].

Example: SA=00-01-02-03-04-05; DA=0A-0B-0C-0D-0E-0F

A=(0x5<<4) 0xF==0x5F (answer)

Part B (Iterative process for outermost VLAN of the packet)

If the packet is a PBT-transit packet, such as the packet illustrated in FIG. 5, the B-TAG of layer-two header 502 is the BVID "space." If terminating PBT/MPLS, or the packet is a QnQ/Standard-VLAN packet, such as packet 300, then the outermost VLAN is the SVID/CVID "space" (e.g., C-TAG of layer-two header 302).

Figure 7:
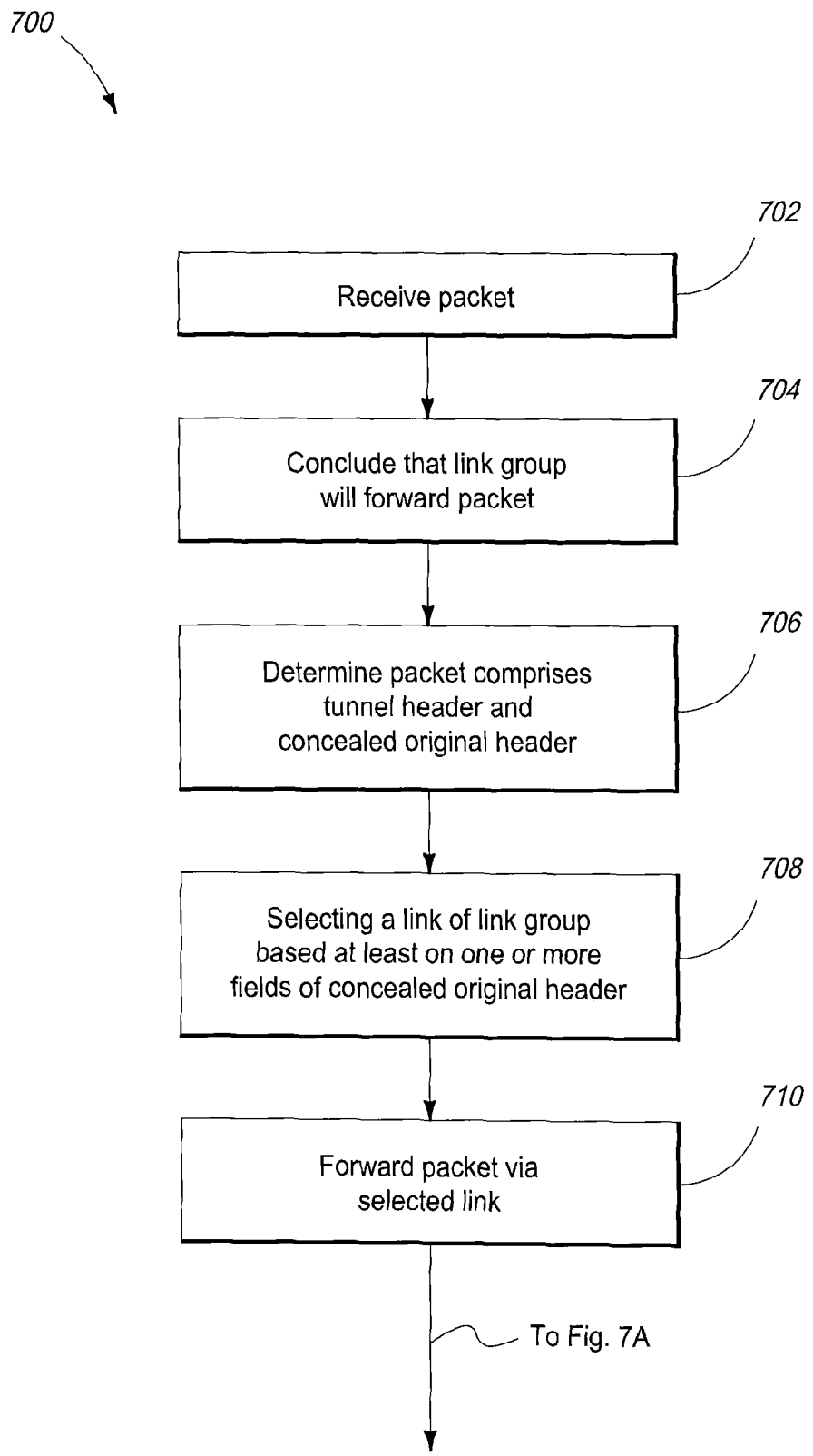
FIG. 7 is a flow chart illustrating a network node operating method according to one embodiment.

For each VLAN found (outer to inner), this byte is left-shifted 4, and then the first 4 bits (nibble) of the least significant byte (LSB) of the VLAN is added.
B=(B<<4)|(VID & 0x00 00F)
Example 1: if the packet has 1 VLAN (0x001) then B=0x01 (answer)
Example 2: if the packet has 2 VLANs (0x001, 0x002) then
→81-00-00-01-81-00-00-02
→Iteration (a), B=0x01
→Iteration (b), B=0x12 (answer)
Part C
C=The last 3 bits of the first nibble and the first bit of the second nibble of the LSB of the source IP address, e.g., SIP[3], left-shifted 4 bits, then concatenated with the last 3 bits of the first nibble and the first bit of the second nibble of the LSB of the destination IP address, e.g., DIP[3].
Example: SIP=192(C0).168(A8).19(13).60(3C)
0x3C-→(binary) 0011__1100
take bits 001[1110]0==0xE (use this value)
DIP=192(C0).168(A8).19(13).88(58)
0x21-→(binary) 0101__1000
take bits 010[1100]0==0xC (use this value)
C=((0xE<<4)|0xC)==0xEC (answer)
Part D
D=First nibble of the LSB of the layer-four source port, e.g., SP[1], left shifted 4 bits, then concatenated with the first nibble of the LSB of the layer-four destination port, e.g., DP[1].
Example: SRC=56733==0xDD9D
DST=1272==0x04F8
D=((0xD<<4)|0x4)==0xD4 (answer)
Notes:
If the packet is an IP packet, but does not use TCP or UDP in layer four, then D will be ZERO.
If the packet is not an IP packet, C and D will both be ZERO.
GRE Support: Regardless of transport type (PBB-TE termination or transit, MPLS_TP, QnQ, etc) if the base-frame is GRE, such as packet 400:
1) C will have "customer" IP SIP/DIP values from layer-three header 304 instead of the SIP/DIP values from layer-three header 404.
2) D will have the LSB of the "key" field of GRE header 406 instead of "customer" layer-four port values.
Then the math is:
P={A,B} xor {C,D};
T=P>>8;
M=(P&0x00FF) x or T;
Q=M>>4;
R=(M & 0x000F) x or Q;
Destination Selector=R[3:0] (take first nibble of byte R!!!)
From above examples: A=0x5F, B=0x12, C=0xEC, D=0xD8
P=0x5F12 xor 0xECD4==0xB3C6
T=0xB3C6>>8==0xB3
M=0xC6 xor 0xB3==0x75
Q=0x75>>4==0x07
R=0x05 xor 0x07==0x02
Destination Selector=R[3:0]==0x0[E]==0xE or bin #14 (answer)
The destination selector may map to a particular link of link group 116. Accordingly, hashing algorithm 606 identifies a particular link of link group 116.
Referring to FIG. 7, a flow chart 700 illustrating a network node operating method is illustrated. At 702, node 102 receives a packet. At 704, node 102 concludes that link group 118 connecting node 102 to node 104 will forward the packet to node 104. At 706, node 102 determines that the packet comprises a tunnel header and an original header concealed by the tunnel header. At 708, distribution circuitry 204 selects one link from among a set of parallel links of link group 118 based at least on one or more fields of the concealed original header. At 710, node 102 forwards the packet to node 104 via the selected link.

Figure 7A:
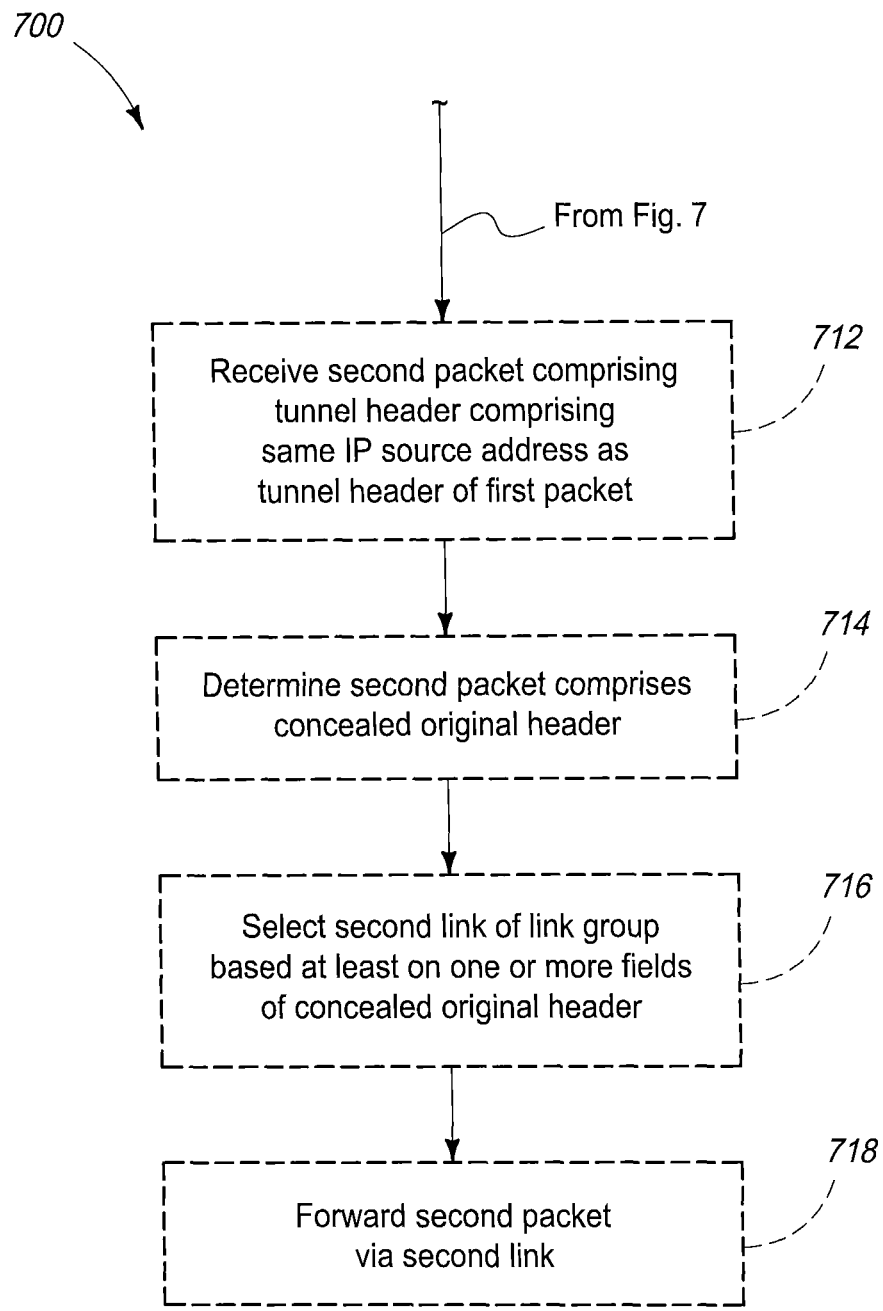
FIG. 7A is a flow chart illustrating additional steps of the network node operating method illustrated in FIG. 7 according to one embodiment.

In some embodiments, additional steps may take place as illustrated in FIG. 7a. At 712, node 102 receives a second packet comprising a tunnel header comprising the same IP source address as the tunnel header of the first packet. At 714, node 102 determines that the second data packet comprises an original header concealed by the tunnel header of the second data packet. At 716, distribution circuitry 204 selects a second link from among the set of parallel links of link group 118 based at least on one or more fields of the original header of the second data packet, the second link of the link group being different from the one link of the link group. At 718, node 102 forwards the second packet to node 104 via the second link.

Figure 8:
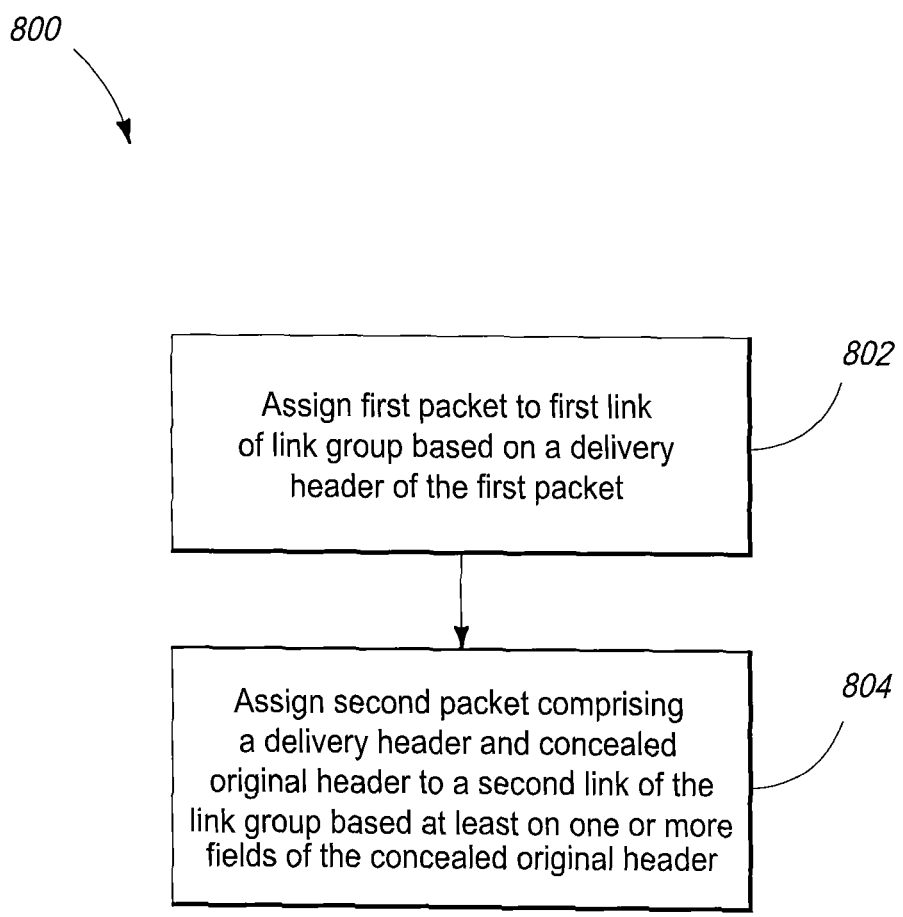
FIG. 8 is a flow chart illustrating another network node operating method according to one embodiment.

Referring to FIG. 8, a flow chart 800 illustrating a network node operating method is illustrated. At 802, node 102 assigns a first packet to a first link of a set of parallel links of link group 118 connecting nodes 102 and 104 based on a delivery header of the first packet, the first packet not comprising a concealed original header. At 804, node 102 assigns a second packet comprising a delivery header and a concealed original header to a second link of link group 118 based at least on one or more fields of the concealed original header.

According to another aspect of the invention, an article of manufacture includes media including programming configured to cause processing circuitry (e.g., a microprocessor) to perform processing that executes one or more of the methods described above. The programming may be embodied in a computer program product(s) or article(s) of manufacture, which can contain, store, or maintain programming, data, and/or digital information for use by or in connection with an instruction execution system including processing circuitry. In some cases, the programming may be referred to as software, hardware, or firmware.

For example, the media may be electronic, magnetic, optical, electromagnetic, infrared, or semiconductor media. Some more specific examples of articles of manufacture including media with programming include, but are not limited to, a portable magnetic computer diskette (such as a floppy diskette or a ZIP® disk manufactured by the Iomega Corporation of San Diego, Calif.), hard drive, random access memory, read only memory, flash memory, cache memory, and/or other configurations capable of storing programming, data, or other digital information.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:
1. A network node operating method comprising:
a source node receiving a packet having an original header including a destination node address, the source node forwarding the packet to a first tunnel node;
the first tunnel node adding a tunnel header to the packet, the tunnel header including a destination node tunnel address different from the destination node address;

a first network node receiving the packet from the first tunnel node;

the first network node concluding that a link group connecting the first network node to a second network node will forward the packet to the second network node;

the first network node determining that the packet comprises the tunnel header and the original header concealed by the tunnel header;

first selecting a first link from among a set of parallel links of the link group based at least on one or more fields of the tunnel header;

determining that a current capacity consumption of the selected first link is approximately at a maximum capacity;

second selecting a second link from among the set of parallel links of the link group based on one or more fields of the concealed original header, the selected second link being different than the selected first link; and forwarding the packet to the second network node via the selected second link.

2. The method of claim 1 wherein the original header is an Internet Protocol (IP) header and the tunnel header is an IP tunnel header and wherein the second selecting comprises selecting based at least on one or more fields of the concealed original IP header.

3. The method of claim 1 wherein the concluding comprises concluding based on the tunnel header without considering the concealed original header.

4. The method of claim 1 wherein the tunnel header conceals the original header by offsetting the original header from the front of the packet by a different number of bits than if the tunnel header was not present in the packet.

5. The method of claim 1 wherein the original header is a layer-two header comprising a first layer-two source address and a first layer-two destination address and the tunnel header is a layer-two header comprising a second layer-two source address different from the first layer-two source address and a second layer two destination address different from the first layer-two destination address.

6. The method of claim 1 wherein the first network node determining that the packet comprises the tunnel header and the original header concealed by the tunnel header comprises determining based at least in part on a field of the tunnel header.

7. The method of claim 1 wherein the original header is a layer-three header comprising a first IP source address and a first IP destination address and the tunnel header is a layer-three header comprising a second IP source address different from the first IP source address and a second IP destination address different from the first IP destination address.

8. The method of claim 1 wherein the packet further comprises a Generic Routing Encapsulation (GRE) header and the tunnel header indicates that the GRE header is present in the packet.

9. The method of claim 8 wherein the second selecting comprises selecting based on one or more fields of the GRE header.

10. The method of claim 1 wherein the packet is a first packet and the tunnel header of the first packet comprises an IP source address and further comprising:

the first network node receiving a second packet comprising a tunnel header comprising the same IP source address as the tunnel header of the first packet;

determining that the second data packet comprises an original header concealed by the tunnel header of the second data packet;

selecting a second link from among the set of parallel links of the link group based at least on one or more fields of the original header of the second data packet, the second link of the link group being different from the one link of the link group; and forwarding the second packet to the second network node via the second link.

11. The method of claim 1 wherein the forwarding comprises forwarding without modifying any address comprised by the packet.

12. A network node operating method comprising:

assigning a first packet to a first link of a set of parallel links of a link group connecting two network nodes based on a delivery header of the first packet, the first packet not comprising a concealed original header; and assigning a second packet comprising a delivery header and a concealed original header to a second link of the link group based at least on one or more fields of the concealed original header and a capacity level of the first link.

13. The method of claim 12 wherein assigning the first packet and assigning the second packet comprises assigning the first packet and assigning the second packet without user intervention between the assigning of the first packet and the assigning of the second packet.

14. The method of claim 12 wherein the concealed original header is encapsulated by a GRE header.

15. The method of claim 12 wherein the delivery header of the first packet and the delivery header of the second packet both comprise the same source IP address.

16. The method of claim 15 wherein the delivery header of the first packet and the delivery header of the second packet both comprise the same destination IP address.

17. A network node comprising:

a plurality of ports;

a switching fabric configured to forward packets to the plurality of ports; and distribution circuitry configured to:

receive a packet from one of the ports;

determine that the received data packet comprises a tunnel header and an original header concealed by the tunnel header;

select a first link from among a set of parallel links of a link group associated with two or more of the ports of the plurality based at least on one or more fields of the tunnel header;

select a second link from among the set of parallel links of a link group associated with two or more of the ports of the plurality based at least on one or more fields of the concealed original header and a capacity level of the selected first link; and instruct the switching fabric to forward the packet to the port of the plurality associated with the selected second link.

18. The node of claim 17 wherein the link group is an Ethernet link aggregation group and the links of the link group share a common link group address.

19. The node of claim 17 wherein the distribution circuitry is further configured to receive additional packets having the tunnel header but different concealed original headers relative to one another and to distribute the additional packets among the links of the link group based at least in part on the concealed original headers, the tunnel header being associated with an aggregation of customer flows and the concealed original headers being associated with the customer flows.

20. The node of claim 17 wherein the distribution circuitry is configured to assign the packet to the selected second link prior to forwarding the packet to the switching fabric.

\* \* \* \* \*